United States Patent
Berger et al.

(10) Patent No.: US 7,716,705 B2
(45) Date of Patent: May 11, 2010

(54) REMOTE DVR MANAGER

(75) Inventors: William H. Berger, Austin, TX (US); Todd P. Bowen, Austin, TX (US)

(73) Assignee: Time Warner Cable Inc., New York, NY (US)

( * ) Notice: Subject to any disclaimer, the term of this patent is extended or adjusted under 35 U.S.C. 154(b) by 600 days.

(21) Appl. No.: 11/215,942

(22) Filed: Aug. 31, 2005

(65) Prior Publication Data

US 2007/0050818 A1   Mar. 1, 2007

(51) Int. Cl.
   G06F 3/00       (2006.01)
   G06F 13/00      (2006.01)
   H04N 5/445      (2006.01)

(52) U.S. Cl. ............................. 725/58; 725/86; 725/109

(58) Field of Classification Search .................... 725/58, 725/83, 109, 107
   See application file for complete search history.

(56) References Cited

U.S. PATENT DOCUMENTS 6,952,729 B2 * 10/2005 Bialk et al. ................. 709/224
2002/0184635 A1 * 12/2002 Istvan .......................... 725/51
2003/0097655 A1 * 5/2003 Novak .......................... 725/31
2003/0149988 A1 * 8/2003 Ellis et al. ..................... 725/87
2004/0054771 A1 * 3/2004 Roe et al. .................... 709/224
2005/0229212 A1 * 10/2005 Kuether et al. ................ 725/58

* cited by examiner

Primary Examiner—Scott Beliveau
Assistant Examiner—Kunal Langhnoja
(74) Attorney, Agent, or Firm—The Marbury Law Group, PLLC

(57) ABSTRACT

A system and method for programming a digital video recorder (DVR) over a scheduling network. Program schedule information is provided to a user of a DVR via the scheduling network. A program selection is received from the scheduling client associated with a subscriber via the scheduling network. State information indicative of a state of a program provisioning system is used to determine whether the program selection is deliverable to the DVR via the program provisioning system. If the program selection is deliverable to the DVR via the program provisioning system, then the program is scheduled for recording by the DVR. The subscriber is notified if the program selection is deliverable or undeliverable.

34 Claims, 3 Drawing Sheets

REMOTE DVR MANAGER

BACKGROUND

Embodiments of this invention are generally related to interactive cable television services and more particularly related to enabling a cable television service user to remotely manage a digital video recorder (DVR) over a network.

Cable networks have evolved from downstream broadcast systems provided over coax cable to hybrid fiber cable (HFC) networks capable of both downstream and upstream communications using both analog and digital signals. With respect to video services, modern set top boxes send upstream signals to the headend to request video on demand (VOD) services, pay per view (PPV) services, and switched video broadcast (SVB) services and to issue control commands (play, stop, fast forward, rewind, and pause) that affect the video stream. Two-way STBs are addressable, can be associated with a user, and can be associated with a physical location within an HFC cable network. DVRs allow subscribers to determine what to watch and when.

DVRs have become extremely popular over the last several years. Millions of people rely on these devices to pause and rewind live television, and to keep track of broadcast schedules and record programs for them. Many consider them just as essential to their daily lives as their cell phones. The DVR records television shows to a hard disk in digital format. The DVR receives programming in digital format or converts analog signals to digital format.

Because the recording is digital, it can be manipulated to provide features not available to analog recorders. For example, a DVR allows a user to pause live TV, provide instant replay of interesting scenes, and skip advertising.

One of the most compelling features of a DVR is the ability to schedule program recordings based on an interactive program guide (IPG). IPG's are typically downloaded to a DVR and used by a user to select programs for recording. Some DVRs interact with the IPG to allow programs to be recorded on a recurring basis. Other DVRs provide for recording programs by "type." In this mode, the DVR uses an algorithm to select programs for recording that meet preference criteria established by the user or that are similar to programs selected by the user.

Downloading of the IPG is typically accomplished via a network. Some DVRs support an Internet connection while others comprise a modem for downloading files via the public switched telephone network. In a cable environment, the IPG may be acquired from a set top box using an out-of-band channel or from a DOCSIS-compliant set top box via a high speed digital link. IPGs vary in detail and the frequency with which the programming data is updated.

A DVR that supports a network connection is a candidate for network based remote scheduling. Remote scheduling is similar to scheduling programming at the DVR. For example, in a Web-based remote scheduling system, a searchable IPG is provided on a Web page. A program is selected and the program selection is downloaded to the DVR during a communication session between the IPG server and the DVR using the network connection established for the IPG download.

While remote scheduling of programs enhances the user experience with a DVR, the current systems use a store-and-forward model that does not provide a user with confirmation that the selected program will actually be recorded. For example, if the network connection between an IPG remote scheduler and the DVR is faulty, the program selection may not be communicated to the DVR in time for recording the selected program. The DVR may not be able to record the selected program because it is turned off or is not properly connected, or because the DVR does not have sufficient storage space. The program receiver, such as a set top box (STB), may not be able to acquire the selected program because of problems with the STB, problems with the network to which it is connected, and/or problems with the programming source, such as a video-on-demand server.

What would be useful is a remote scheduling system that evaluates current diagnostic information relevant to the recording of a selected program and informs a DVR user that the selected program will not be saved to the DVR.

SUMMARY

An embodiment of the present invention comprises a DVR remote scheduling system that evaluates state information of a program provisioning system and determines whether the selected program can be recorded. A program provisioning system comprises a program source, a path between the program source and a user's DVR, and the DVR. In another embodiment, if the evaluation of the state information of the program provisioning system determines that the recording of a selected program cannot proceed, the DVR remote scheduling system denies scheduling of that program for recording.

By way of illustration, the path from the program source to the user's DVR comprises network components. The operational state of these network components may be, without limitation, determined from the results of pinging STBs and cable modems, by analyzing VOD log files, by polling STBs and cable modems for RDC levels, and by analyzing the user outage complaints. Structural and procedural concepts for isolating and correcting faults in network components and CPE have been disclosed in U.S. patent application Ser. No. 11/040,391, filed Jan. 21, 2005, for "A Fault Isolation System And Method;" in U.S. patent application Ser. No. 11/069,155, filed Mar. 1, 2005, for "An Early Warning Fault Identification And Isolation System For A Two-Way Cable Network;" in U.S. patent application Ser. No. 11/069,156, filed Mar. 1, 2005, for "A Fault Detection And Isolation System For An HFC Cable Network And Method Therefor;" and U.S. patent application Ser. No. 11/069,080 filed Mar. 1, 2005 for "A System And Method For Identifying And Isolating Faults In A Video On Demand Provisioning System." The Ser. No. 11/040,391, the Ser. No. 11/069,155, the Ser. No. 11/069,156 and the Ser. No. 11/069,080 applications are incorporated herein in their entirety for all purposes. These applications are collectively referred to herein as the "Fault Applications."

Current state information is determined to be relevant to a program save request based on attributes of the program to be saved and the subscriber account data. By way of illustration, if a user is receiving only basic cable such that no STB is required, data relating to STBs would not be relevant to the program request. If the user requests a program that is available on a channel that requires an STB, the subscriber account data will reflect that the user does not have an STB, and the user will be alerted that the selected program is not available for recording.

If the subscriber account data indicates that the user uses an STB, the state of the network path required to deliver the requested program to the user is relevant to the recording of the selected program. If any device in the path is determined to have failed, the user will be alerted that the reservation is not available.

Additionally, the state of the source of the selected program may be determined by checking error log data and updated interactive program guide data.

It is therefore an aspect of the present invention to enable a DVR user to access an interactive program guide (IPG) via a network and to select programming for recording to a DVR.

It is another aspect of the present invention to evaluate diagnostic information relevant to the recording of a program selected by the DVR user via the network and to advise the DVR user if the selected program cannot be recorded.

It is yet another aspect of the present invention to inform the DVR user of the problem that is preventing the selected program from being recorded and whether the DVR user may correct the problem.

It is still another aspect of the present invention to create a trouble ticket when an evaluation of diagnostic information relevant to the recording of a program selected by the DVR user determines that the selected program cannot be recorded.

It is another aspect of the present invention to monitor changes in program scheduling and to inform a user when a program selected for recording has been rescheduled.

It is another aspect of the present invention to notify the user upon successful recording via an existing messaging system available to the user. By way of illustration and not as a limitation, this notification may be accomplished using email or text messaging via an STB.

These and other aspects of the present invention will become apparent from a review of the description that follows.

An embodiment of the present invention provides a method for programming a digital video recorder (DVR) over a scheduling network. Program schedule information is provided to a scheduling client associated with a subscriber via the scheduling network. A program selection is received from the scheduling client via the scheduling network. According to an embodiment of the present invention, the scheduling network comprises the Internet. Subscriber account data associated with a subscriber account is received. Using the subscriber account data, a determination is made whether the subscriber account is entitled to receive the program selection. If the subscriber account is entitled to receive the program selection, state information indicative of a state of a program provisioning system is received. Using the program provisioning system state information, a determination is made whether the program selection is deliverable to the DVR via the program provisioning system. If the program selection is deliverable to the DVR via the program provisioning system, the program selection is scheduled for recording by the DVR.

According to an embodiment of the present invention, the program provisioning system comprises a program source. Receiving state information indicative of the state of the program provisioning system comprises receiving program source state information. Making a determination whether the program selection is deliverable to the DVR via the program provisioning system comprises determining from program source state information that the program selection is available from the program source.

According to another embodiment of the present invention, the program provisioning system comprises a network path. Receiving state information indicative of the state of the program provisioning system comprises receiving network path state information. Making a determination whether the program selection is deliverable to the DVR via the program provisioning system comprises determining from network path state information that the network path is available to deliver the program selection to the DVR.

In yet another embodiment of the present invention, the network path comprises a cable network. In this embodiment, the network path state information comprises information indicative of the performance of devices comprising the cable network. In still another embodiment of the present invention, the network path is determined in part using subscriber account data. According to an embodiment of the present invention, subscriber account data is selected from the group consisting of an STB IP address, an STB MAC address, a node associated with the STB, a modulator associated with the STB and the hub, a demodulator associated with the STB and the hub, a power supply associated with the node, an amplifier associated with the STB, a line extender associated with the STB, a customer account number, a customer account status, a customer address, and a customer phone number.

In an embodiment of the present invention, the program provisioning system comprises a CPE unit associated with the subscriber. Receiving state information indicative of the state of the program provisioning system comprises receiving CPE state information. Making a determination whether the program selection is deliverable to the DVR via the program provisioning system comprises determining from CPE state information that the CPE is able to receive the program selection. In another embodiment of the present invention, the CPE unit comprises a set top box (STB) and CPE state information comprises a two-way communication status of the STB, a transmit signal level of the STB, and a receive signal level of the STB. In yet another embodiment of the present invention, the CPE unit comprises the DVR, and CPE state information comprises a measure of available memory on the DVR relative to a memory requirement of the program selection.

In still another embodiment of the present invention, if the program selection is deliverable to the DVR via the program provisioning system, then the subscriber is notified that the program selection is available. If the program selection is undeliverable to the DVR via the program provisioning system, then the subscriber is notified that the program selection is unavailable. In one embodiment of the present invention, the notification comprises an email sent to the subscriber. In another embodiment of the present invention, the program provisioning system comprises a set top box associated with the subscriber, and the notification of the subscriber comprises a text message sent to the set top box.

In an embodiment of the present invention, a digital video recorder (DVR) remote scheduling system comprises a scheduling network, a scheduling client, a scheduling server and a state evaluator. The scheduling client is associated with a subscriber. The scheduling server provides program schedule information to a scheduling client via the scheduling network. According to an embodiment of the present invention, the scheduling network comprises the Internet. The scheduling server receives a program selection from the scheduling client via the scheduling network. The program selection is made by a DVR user using the scheduling client. The scheduling server receives a determination from a state evaluator whether a program selection is available. If the program selection is available, the program selection is scheduled for recording on the DVR.

The state evaluator receives subscriber account data of a subscriber account associated with the subscriber. Using the subscriber account data, the state evaluator determines whether the subscriber account is entitled to receive the program selection. If the subscriber account is entitled to receive the program selection, then state information indicative of a state of a program provisioning system is received. The program provisioning system state information is used by the state evaluator to make a determination whether the program selection is deliverable to the DVR via the program provisioning system. If the program selection is deliverable to the DVR via the program provisioning system, the scheduling server is notified that the program selection is available.

In another embodiment of the present invention, if the program selection is deliverable to the DVR via the program provisioning system, then the scheduling server notifies the subscriber that the program selection is available. If the program selection is undeliverable to the DVR via the program provisioning system, then the scheduling server notifies the subscriber that the program selection is unavailable. In one embodiment of the present invention, the notification comprises an email sent to the subscriber. In another embodiment of the present invention, the program provisioning system comprises a set top box associated with the subscriber and the notification of the subscriber comprises a text message sent to the set top box.

DETAILED DESCRIPTION

Figure 1:
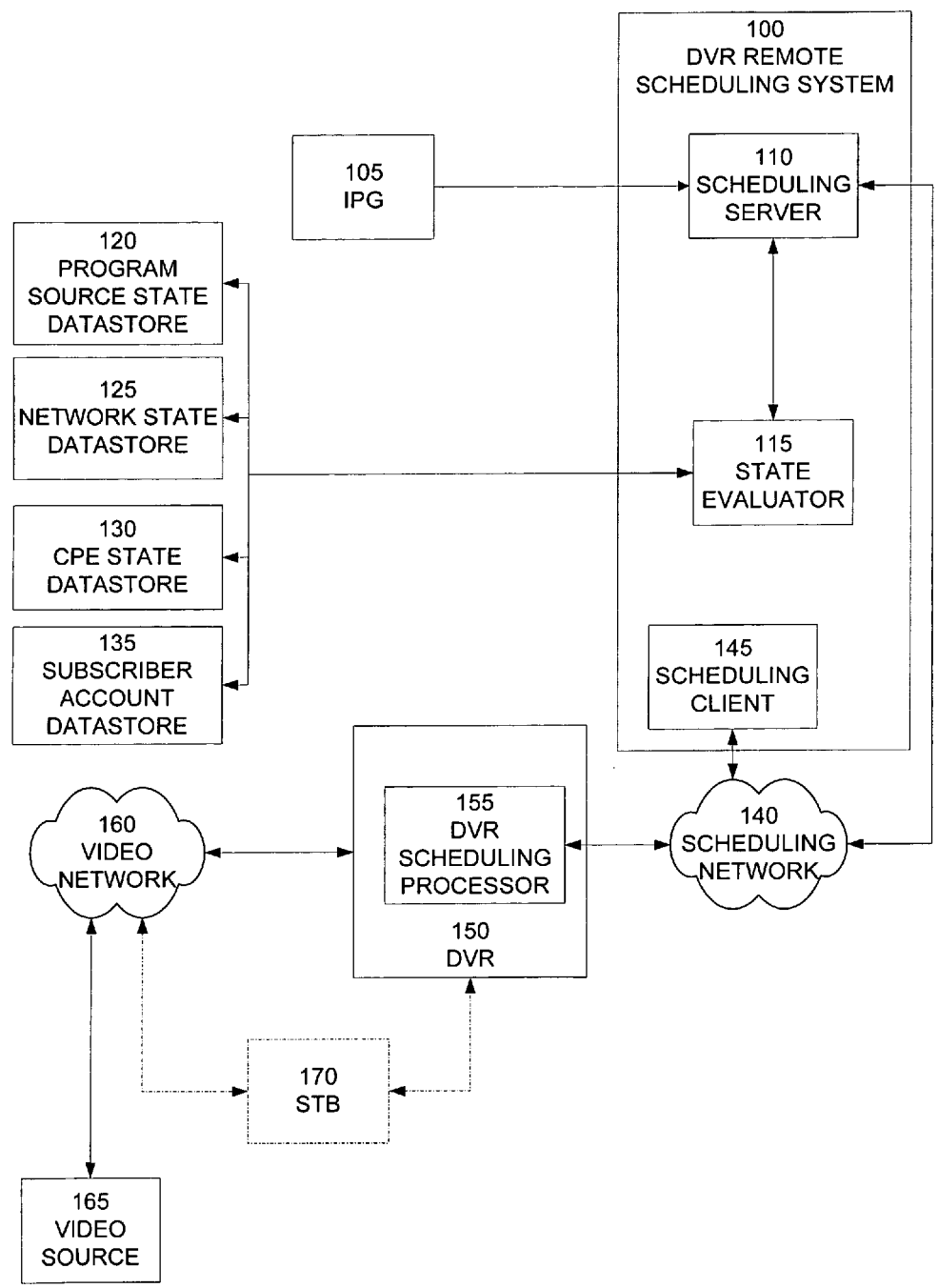
FIG. 1 illustrates a remote DVR scheduling system according to an embodiment of the present invention.

The following terms are used in the description that follows. The definitions are provided for clarity of understanding:

| | |
|---|---|
| HFC - | Hybrid Fiber Coax. A network design that employs both fiber optic and coaxial cables to deliver cable video and data services. |
| Hub - | The local source of cable services. By way of illustration and not as a limitation, a hub may server 20,000 subscribers. |
| IPG - | Interactive program guide. An electronic version of a program schedule comprising link data that allows a user to select a program for viewing. The selection of a program controls the operation of a STB or DVR. |
| Node - | A device that provides an interface between the fiber optic and coaxial cable systems of an HFC cable system. Light from a fiber optic cable is converted into an electrical signal suitable for delivery in a coaxial cable system within this device. |
| PING - | The verb "to PING" means the act of using the ping utility or command. The ping utility sends a packet to a device with an IP address and waits for a response. The response is indicative that the ping packet was received by the device and the device is present on the network. The noun "ping" means the request for a response from a network device. |
| Poll - | The verb "poll" means the act of using a utility or command by one network device to request data from another network device. |
| RDC level - | Reverse data carrier level. A measure of the signal strength of the upstream signal generated by an STB or other CPE device. |
| STB - | Set top box. As used herein, a STB comprises a standalone device and a device meeting the OpenCable Applications Platform Specification (OCAP), sometimes referred to as a DSG client. |
| VOD - | Video on demand. VOD is the generic term for a collection of services such as HBO on demand (HOD), movies on demand (MODULATOR) SVOD (subscription video on demand), FOD (free on demand), and other similar services. |

An embodiment of the present invention comprises a DVR remote scheduling system that evaluates state information of a program provisioning system relevant to the recording of a selected program and determines whether the selected program can be recorded. A program provisioning system comprises a program source, a path between the program source and a user's DVR, and the DVR. In another embodiment, if the evaluation of the state information of the program provisioning system determines that the recording of a selected program cannot proceed, the DVR remote scheduling system denies scheduling of that program for recording.

In another embodiment of the present invention, changes in program schedules are monitored and a user is informed when a program selected for recording has been rescheduled. By way of illustration and not as a limitation, a user may be, without limitation, notified of a schedule change by e-mail message, a message to the subscriber's DVR, or a message sent to the user's STB and displayed on the subscriber's monitor. Optionally, the user may authorize the DVR scheduling system to reschedule the program selected for recording and notify the user only if the new program schedule creates a conflict with another scheduled recording.

In still another embodiment of the present invention, if a program selected for recording is scheduled in multiple time slots, the DVR scheduling system will select a time for recording the selected program that does not conflict with other scheduled recordings or will suggest modifications to the recording list to accommodate recording all selected programs.

FIG. 1 illustrates a DVR remote scheduling system according to an embodiment of the present invention. Referring to FIG. 1, a DVR remote scheduling system (DVR RSS) 100 comprises a scheduling server 110, a state evaluator 115, and a scheduling client 145. An IPG 105 provides program schedule information to scheduling server 110. A user (not illustrated) uses a scheduling client 145 to communicate with scheduling server 110 via scheduling network 140. In an embodiment of the present invention, scheduling client 145 is a browser, scheduling server 110 is a web server, and scheduling network 140 is the Internet.

Scheduling server 110 communicates scheduling selections to DVR scheduling processor 155 of DVR 150 via scheduling network 140. DVR scheduling processor 155 controls the video content that is received from video source 165 via video network 160 and recorded by DVR 150. Also illustrated is optional STB 170. As will be appreciated by those skilled in the art, STB 170 and DVR 150 may be integrated into a single standalone device or may be operated as discrete components. Further, the operation of the DVR RSS 100 does not require STB 170.

Program scheduling server 110 receives state information from state evaluator 115. As illustrated in FIG. 1, state evaluator 115 receives state data from program source state datastore 120, network state data from datastore 125, CPE state data from CPE state datastore 130, and subscriber account data from subscriber account datastore 135. State evaluator 115 determines the relevance of the state data from datastores 120, 125, and 130 to the user's request based on subscriber account data in subscriber account datastore 135 and makes determinations as to whether the program request can be granted. As will be discussed further below, state data is determined to be relevant to a program save request based on attributes of the program to be saved and the subscriber account data.

Program source state data 120 comprises the state of the source of a program selected by a user for recording on a DVR 150.

Network state data 125 comprises the state of the network path between the user's DVR 150 and video source 165. The state of the network path is determined diagnostically and by analyzing log data and by reference to subscriber account data from subscriber account datastore 135. For an example of the acquisition of network state data, see the various disclosures of the Fault Applications referenced above.

CPE state data 130 provides operational information about customer premises equipment as it relates to the scheduling of a program for recording. By way of illustration and not as a limitation, in an embodiment of the present invention, the video source 165 is a premium channel provided via STB 170. In this embodiment of the present invention, CPE state datastore 130 comprises state information about STB 170.

User account datastore 135 comprises subscriber account data. According to an embodiment of the present invention, subscriber account data comprises an STB IP address, an STB MAC address, a cable modem IP address, a cable modem MAC address, a DVR IP address, a DVR MAC address, a node associated with the user's CPE, a modulator associated with the user's CPE and the hub, a demodulator associated with the user and the hub, a power supply associated with the node, an amplifier associated with the user's CPE, a line extender associated with the user's CPE, a customer account number, a customer account status, a customer address, and a customer phone number. As will be appreciated by those skilled in the art, subscriber account datastore 135 may include other subscriber account data without departing from the scope of the present invention.

The state evaluator 115 evaluates the subscriber account data and the state data to determine if the request to record the selected program can be granted. The state evaluator determines whether the subscriber account is active, whether the selected program is available, whether a network path can be established to deliver the program selection, and whether the CPE at the user's location is able to receive the program selection.

Figure 2A:
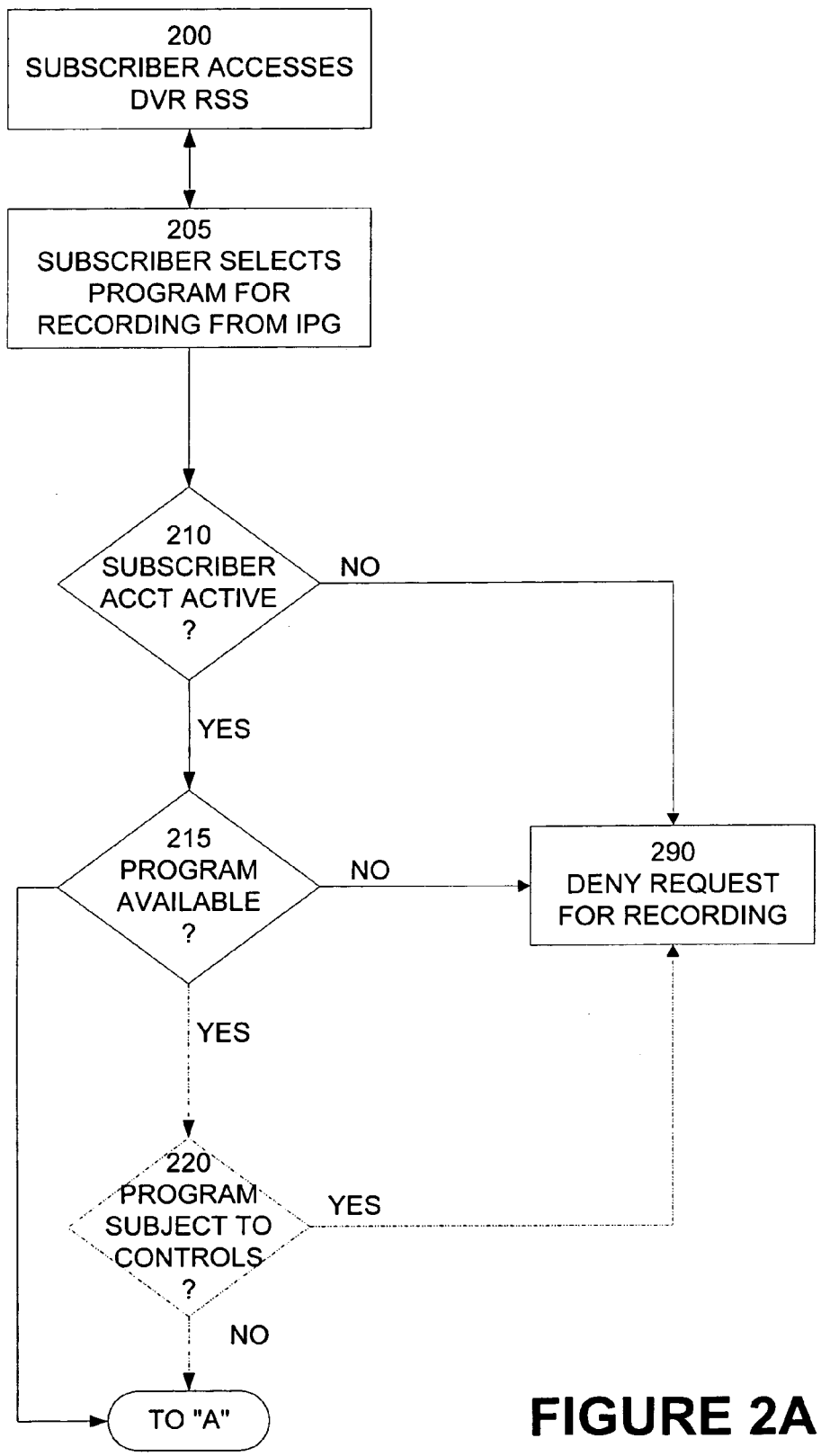
FIGS. 2A and 2B illustrate a flow diagram of a process by which a DVR remote scheduling system processes a request to record a selected program according to an embodiment of the present invention.
Figure 2B:
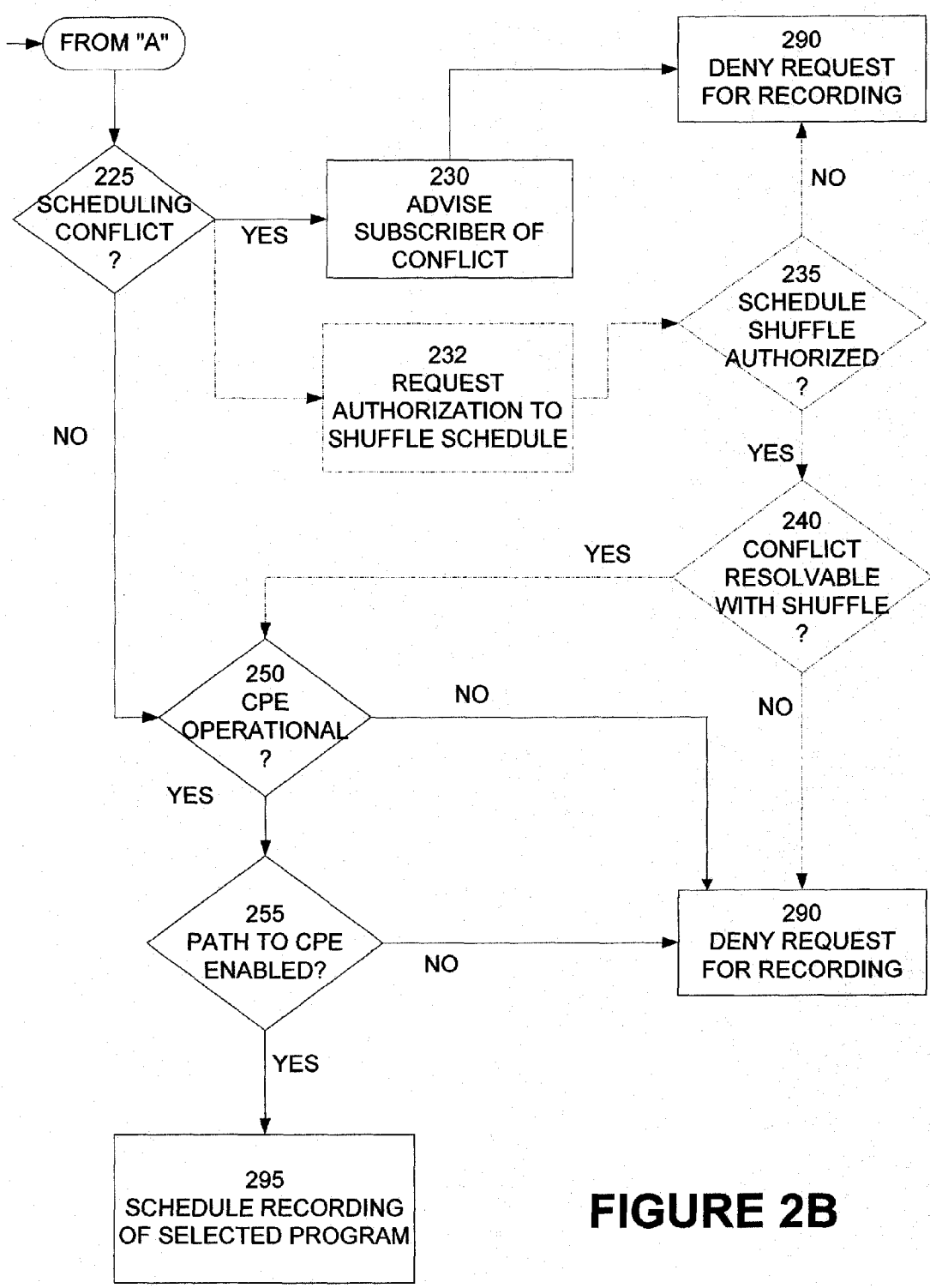

FIGS. 2A and 2B illustrate a flow diagram of a process by which a DVR remote scheduling system processes a request to record a selected program according to an embodiment of the present invention. Referring to FIG. 2A, a user accesses a DVR remote scheduling system (DVR RSS) 200. The user is presented with a program schedule in the form of an IPG. The user selects a program for recording from the IPG 205.

The DVR RSS then evaluates the selection to determine if the request to record the selected program can be granted. FIG. 2 illustrates various checks performed by the DVR RSS. However, as will be appreciated by those skilled in the art, the order in which those checks are performed may be changed to accommodate the preferences of the system operator without departing from the scope of the present invention. Additionally, optional checks may be omitted without departing from the scope of the present invention.

The DVR RSS determines whether the subscriber account is active 210. According to an embodiment of the present invention, subscriber account information is available from a subscriber account datastore (see FIG. 1, 135). In an exemplary embodiment of the present invention, the subscriber account datastore comprises a billing system. If the subscriber account is not active, then the DVR RSS denies the request for recording the selected program 290. If the subscriber account is active, the DVR RSS determines whether the selected program is available 215.

According to an embodiment of the present invention, the availability of the program is determined by reference to a program source state datastore (see FIG. 1, 120). The program source state datastore comprises operational status information for cable network components that store, manage, and deliver specific programs. By way of illustration and not as a limitation, in an embodiment of the present invention, the program selected by the user is a movie that is stored as a data file on a video server. In this embodiment, the programming source state data comprises the condition of the data file (that is, whether it is error free or corrupted), the operational status of the video server, and whether the program selected from the IPG matches the start time, duration, and channel as reflected in the video server. If the movie is available as video-on-demand, the programming source state data would further comprise the operational status of the video-on-demand system components.

If for any reason the program is deemed "not available," then the DVR RSS denies the request for recording the selected program 290.

According to an embodiment of the present invention, a user may optionally establish program preference controls with the DVR RSS that preclude recording of material from specified channels, with a particular rating, or by program title. The DVR RSS may optionally evaluate the selected program to determine if it conflicts with any control preferences established by the user 220. If the selected program conflicts with a control preference, then the DVR RSS denies the request for recording the selected program 290. In an alternative embodiment, the user may be prompted by the DVR RSS for an override code that suspends the operation of the control preferences for the selected program.

Referring to FIG. 2B, if the selected program does not conflict with a control preference, or if a control preference is overridden by the user, DVR RSS determines whether the selected program conflicts with a previously scheduled recording 225. This determination is made based on the scheduling information from the CPE state datastore (see FIG. 1, 130). According to an embodiment of the present invention, the state evaluator (see FIG. 1, 115) queries the user DVR (see FIG. 1, 150) to determine the programs previously scheduled for recording. In an alternative embodiment, this information is "pushed" from the DVR (see FIG. 1, 150) to the CPE state datastore via an out-of-band channel or via a data channel.

The user is advised of the conflict 230 and the DVR RSS denies the request for recording the selected program 290.

In an alternative embodiment, the DVR RSS requests authorization from the user to "shuffle" the schedule 232. If the request is granted 235, then the DVR RSS determines whether either the selected program or the previously scheduled program is available for recording at another time 240. If the conflict cannot be resolved by shuffling the program schedule 240, or if the user does not authorize schedule shuffling 235, then the DVR RSS denies the request for recording the selected program 290.

If the conflict is resolved, then the DVR RSS determines whether the CPE that is relevant to the recording of the selected program is operational 250. By way of illustration, if a user is receiving only basic cable such that no STB is required, state data relating to STBs would not be relevant to the program request. If the user requests a program that is available on a channel that requires an STB, the subscriber account data will reflect that the user does not have an STB, and the user will be alerted that the selected program is not available for recording.

If the subscriber account data indicates that the user uses an STB, the state evaluator (see FIG. 1, 115) will determine from the subscriber account data the IP address and MAC address of the STB (see FIG. 1, 170) that terminates the signal from the video source (see FIG. 1, 165). These data are used to retrieve state data relating to STB 170 from CPE state datastore 130. By way of illustration and not as a limitation, these data comprise PING results and RDC levels. If the PING results indicate that the STB cannot communicate in both the upstream and downstream direction or if the RDC levels are two low or too high, the DVR RSS denies the request for recording the selected program 290.

If the CPE is operational 250, then the DVR RSS determines whether the path to the CPE is enabled 255. By way of illustration, the operational state of devices that establish the path from the headend to a user's CPE may be, without limitation, determined from the results of pinging STBs and cable modems, by analyzing VOD log files, by polling STBs and cable modems for RDC levels, and by analyzing user outage complaints. In an embodiment of the present invention, these state data are obtained by a state evaluator (see FIG. 1, 115) from a network state datastore (see FIG. 1, 125). In another embodiment of the present invention, state evaluator 115 causes network state datastore 125 to ping and poll the CPE associated with the user requesting scheduling of a program for recording. In this embodiment, the state of the network is determined in near real time.

If any of the devices that establish the path from the headend to the user's CPE are not functioning properly, the DVR RSS denies the request for recording the selected program 290. If the path from the headend to the user's CPE is enabled, the DVR RSS grants the request for recording the selected program 295.

A remote DVR scheduling system has been described. It will be understood by those skilled in the art that the present invention may be, without limitation, embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular. Moreover, a reference to a specific time, time interval, and instantiation of scripts or code segments is in all respects illustrative and not limiting.

What is claimed is:

1. A method for programming a digital video recorder (DVR) associated with a subscriber account over a scheduling network comprising:
   providing program schedule information to a scheduling client associated with a subscriber via the scheduling network;
   receiving a request to record a program selection on the DVR from the scheduling client via the scheduling network;
   receiving subscriber account data of the subscriber account associated with the subscriber;
   using the subscriber account data to make a determination whether the subscriber account is entitled to receive the program selection;
   when the subscriber account is entitled to receive the program selection, then acquiring state information indicative of the state of the DVR from a DVR datastore and acquiring state information indicative of a state of each component of a program provisioning system from a program provisioning system datastore, wherein the DVR datastore and the program provisioning system datastore are remote from the DVR and wherein the program provisioning system comprises a program source and a network path between the program source and the DVR;
   using the DVR state information acquired from the DVR datastore to make a first determination at a time the request is received whether the state of the DVR precludes recording of the program selection at the DVR, wherein the first determination is made remotely from the DVR by a state evaluator;
   using the program provisioning system state information acquired from the program provisioning system datastore to make a second determination at the time the request is received whether the state of a component of the program provisioning system precludes delivery of the program selection to the DVR via the program provisioning system, wherein the second determination is made remotely from the DVR by a state evaluator;
   denying the request when the first determination is that the recording of the program selection is precluded by the state of the DVR, wherein the denial of the request is made by a scheduling server; and
   denying the request when the second determination is that the delivery of the program is precluded by the state of any one component of the program provisioning system wherein the denial of the request is made by the scheduling server.

2. The method for programming a DVR over a scheduling network of claim 1,
   wherein receiving state information indicative of the state of the program provisioning system comprises receiving program source state information; and
   wherein using the program provisioning system state information acquired from the program provisioning system datastore to make a second determination whether the state of a component of the program provisioning system precludes delivery of the program selection via the program provisioning system comprises determining from the program source state information whether the program selection is available from the program source.

3. The method for programming a DVR over a scheduling network of claim 1,
   wherein the program provisioning system comprises a network path;
   wherein receiving state information indicative of the state of the program provisioning system comprises receiving network path state information; and
   using the program provisioning system state information acquired from the program provisioning system datastore to make a second determination whether the state of a component of the program provisioning system precludes delivery of the program selection comprises determining from network path state information whether the network path is available to deliver the program selection to the DVR.

4. The method for programming a DVR over a scheduling network of claim 3, wherein the network path comprises a cable network.

5. The method for programming a DVR over a scheduling network of claim 4, wherein the network path state information comprises information indicative of the performance of devices comprising the cable network.

6. The method for programming a DVR over a scheduling network of claim 3, wherein the network path is determined in part using subscriber account data.

7. The method for programming a DVR over a scheduling network of claim 6, wherein the subscriber account data is selected from the group consisting of a set top box (STB) IP address, an STB MAC address, a node associated with the STB, a modulator associated with the STB and the hub, a demodulator associated with the STB and the hub, a power supply associated with the node, an amplifier associated with the STB, a line extender associated with the STB, a customer account number, a customer account status, a customer address, and a customer phone number.

8. The method for programming a DVR over a scheduling network of claim 1, wherein the program provisioning system further comprises a CPE unit interposed between the DVR and the network path and associated with the subscriber account, wherein receiving state information indicative of the state of the program provisioning system comprises receiving CPE state information, and wherein using the program provisioning system state information acquired from the datastore to make a second determination whether the state of a component of the program provisioning system precludes delivery of the program selection comprises determining from the CPE state information whether the CPE is able to receive the program selection.

9. The method for programming a DVR over a scheduling network of claim 8, wherein the CPE unit comprises a set top box (STB) and the CPE state information comprises a two-way communication status of the STB, a transmit signal level of the STB, and a receive signal level of the STB.

10. The method for programming a DVR over a scheduling network of claim 1, wherein the DVR state information comprises a measure of available memory on the DVR relative to a memory requirement of the program selection.

11. The method for programming a DVR over a scheduling network of claim 1 further comprising:
notifying the subscriber that the request is granted when recording of the program selection is not precluded by the state of the DVR and delivery of the program selection is not precluded by the state of any one component of the program provisioning system.

12. The method for programming a DVR over a scheduling network of claim 11, wherein notifying the subscriber that the request is granted comprises sending the subscriber an email.

13. The method for programming a DVR over a scheduling network of claim 11, wherein the program provisioning system comprises a set top box associated with the subscriber account and wherein notifying the subscriber that the request is granted comprises sending a text message to the set top box.

14. The method for programming a DVR over a scheduling network of claim 1 further comprising notifying the subscriber when the request is denied.

15. The method for programming a DVR over a scheduling network of claim 14, wherein notifying the subscriber that the request is denied comprises sending the subscriber an email.

16. The method for programming a DVR over a scheduling network of claim 14, wherein the program provisioning system comprises a set top box (STB) associated with the subscriber account and wherein notifying the subscriber that the request is denied comprises sending a text message to the STB.

17. The method for programming a DVR over a scheduling network of claim 1, wherein the scheduling network comprises the Internet.

18. A digital video recorder (DVR) remote scheduling system comprising:
a scheduling network;
a scheduling client, wherein the scheduling client is associated with a subscriber;
a DVR datastore remote from the DVR, wherein the DVR datastore comprises state information indicative of the state of the DVR;
a provisioning system datastore remote from the DVR, wherein the provisioning system datastore comprises state information indicative of a state of a program provisioning system and wherein the program provisioning system comprises a program source, and a network path between the program source and the DVR; and
a scheduling server, wherein the scheduling server comprises instructions for:
providing program schedule information to the scheduling client via the scheduling network;
receiving a request to record a program selection on the DVR from the scheduling client via the scheduling network; and
providing the request to a state evaluator, wherein the state evaluator is remote from the DVR; and
wherein the state evaluator comprises instructions for:
receiving subscriber account data of a subscriber account associated with the subscriber;
making a determination whether the subscriber account is entitled to receive the program selection using the subscriber account data;
when the subscriber account is entitled to receive the program selection, then acquiring DVR state information from the DVR datastore and acquiring program provisioning system state information from the program provisioning system datastore;
using the DVR state information acquired from the DVR datastore to determine at a time the request is received whether the state of the DVR precludes recording of the program selection at the DVR;
using the program provisioning system state information acquired from the program provisioning system datastore to determine at the time the request is received whether the state of a component of the program provisioning system precludes delivery of the program selection to the DVR via the program provisioning system; and
sending the determinations to a scheduling server; and
the scheduling server comprising instructions for:
receiving the determinations from the state evaluator;
denying the request when recording of the program selection is precluded by the state of the DVR; and
denying the request when delivery of the program is precluded by the state of any one component of the program provisioning system.

19. The DVR remote scheduling system of claim 18,
wherein the program provisioning system comprises a program source;
wherein state information indicative of the state of the program provisioning system comprises program source state information; and
wherein the instruction for using the program provisioning system state information to determine whether the state of a component of the program provisioning system precludes delivery of the program selection to the DVR comprises an instruction for using the program source state information to determine whether the program selection is available from the program source.

20. The DVR remote scheduling system of claim 18,
wherein the program provisioning system comprises a network path;
wherein state information indicative of the state of the program provisioning system comprises network path state information; and
wherein the instruction for using the program provisioning system state information to determine whether the state of a component of the program provisioning system precludes delivery of the program selection to the DVR comprises an instruction for using the network path state information to determine whether the network path is available to deliver the program selection to the DVR.

21. The DVR remote scheduling system of claim 20, wherein the network path comprises a cable network.

22. The DVR remote scheduling system of claim 21, wherein the network path state information comprises information indicative of the performance of devices comprising the cable network.

23. The DVR remote scheduling system of claim 20, wherein the state evaluator further comprises instructions for determining the network path and wherein the network path is determined in part using the subscriber account data.

24. The DVR remote scheduling system of claim 23, wherein the subscriber account data is selected from the group consisting of a set top box (STB) IP address, an STB MAC address, a node associated with the STB, a modulator associated with the STB and the hub, a demodulator associated with the STB and the hub, a power supply associated with the node, an amplifier associated with the STB, a line extender associated with the STB, a customer account number, a customer account status, a customer address, and a customer phone number.

25. The DVR remote scheduling system of claim 18,
wherein the program provisioning system further comprises a CPE unit interposed between the DVR and the network path and associated with the subscriber account;
wherein state information indicative of the state of the program provisioning system comprises CPE state information; and
wherein the instruction for using the program provisioning system state information to determine whether the state of a component of the program provisioning system precludes delivery of the program selection to the DVR comprises an instruction for using the CPE state information to determine whether the CPE associated with the DVR is able to receive the program selection.

26. The DVR remote scheduling system of claim 25, wherein the CPE unit comprises a set top box (STB) and the CPE state information comprises a two-way communication status of the STB, a transmit signal level of the STB, and a receive signal level of the STB.

27. The DVR remote scheduling system of claim 18, wherein the DVR state information comprises a measure of available memory on the DVR relative to a memory requirement of the program selection.

28. The DVR remote scheduling system of claim 18, wherein the scheduling server further comprises instructions for notifying the subscriber that the request is granted when recording of the program is not precluded by the state of the DVR and delivery of the program selection is not precluded by the state of any one component of the program provisioning system.

29. The DVR remote scheduling system of claim 28, wherein the notification to the subscriber that the request is granted comprises an email sent to the subscriber.

30. The DVR remote scheduling system of claim 28, wherein the program provisioning system comprises a set top box associated with the subscriber and wherein the notification to the subscriber that the request is granted comprises a text message sent to the set top box.

31. The DVR remote scheduling system of claim 18, wherein the scheduling server further comprises instructions for notifying the subscriber that the request is denied.

32. The DVR remote scheduling system of claim 31, wherein the notification to the subscriber that the request is denied comprises an email sent to the subscriber.

33. The DVR remote scheduling system of claim 31, wherein the program provisioning system comprises a set top box (STB) associated with the subscriber and wherein the notification to the subscriber that the request is denied comprises a text message sent to the set top box.

34. The DVR remote scheduling system of claim 18, wherein the scheduling network comprises the Internet.

* * * * *